United States Patent
Woerner et al.

(10) Patent No.: US 6,729,127 B2
(45) Date of Patent: May 4, 2004

(54) EXHAUST CLEANING SYSTEM FOR MOTOR VEHICLES, ESPECIALLY DIESEL-POWERED UTILITY VEHICLES

(75) Inventors: Siegfried Woerner, Esslingen (DE); Peter Zacke, Albershausen (DE); Thomas Hauber, Altbach (DE); Rudolf Buhmann, Esslingen (DE); Marcus Werni, Waiblingen (DE)

(73) Assignee: J. Eberspächer GmbH & Co. KG, Esslingen (DE)

( * ) Notice: Subject to any disclaimer, the term of this patent is extended or adjusted under 35 U.S.C. 154(b) by 16 days.

(21) Appl. No.: 09/930,555

(22) Filed: Aug. 15, 2001

(65) Prior Publication Data

US 2002/0023435 A1 Feb. 28, 2002

(30) Foreign Application Priority Data

Aug. 30, 2000 (DE) .......................... 100 42 542

(51) Int. Cl.⁷ ................................ F01N 3/00
(52) U.S. Cl. ............... 60/297; 60/299; 60/311
(58) Field of Search .................. 60/299, 297, 301, 60/311, 295; 181/265, 269, 272, 282, 256

(56) References Cited

U.S. PATENT DOCUMENTS

| | | | | |
|---|---|---|---|---|
| 2,958,389 A | * | 11/1960 | Deremer | |
| 3,082,840 A | * | 3/1963 | Reindl | |
| 3,712,030 A | * | 1/1973 | Priest | 96/118 |
| 3,822,531 A | * | 7/1974 | Wisnewski et al. | 60/311 |
| 3,960,528 A | * | 6/1976 | Jacobs et al. | 60/311 |
| 3,994,364 A | * | 11/1976 | Nicoll | 181/272 |
| 4,074,975 A | * | 2/1978 | Tokura et al. | 181/272 |
| 4,111,278 A | * | 9/1978 | Bergman | 181/255 |
| 4,628,689 A | * | 12/1986 | Jourdan | 60/311 |
| 5,139,107 A | * | 8/1992 | Nagai | 181/239 |
| 5,373,119 A | * | 12/1994 | Suzuki et al. | 181/258 |
| 5,434,374 A | * | 7/1995 | Hsueh | 181/228 |
| 5,783,782 A | * | 7/1998 | Sterrett et al. | 181/272 |
| 5,902,971 A | * | 5/1999 | Sato et al. | 181/262 |
| 5,959,263 A | * | 9/1999 | Foltz, Jr. | 181/272 |
| 5,984,045 A | * | 11/1999 | Maeda et al. | 181/254 |
| 6,158,214 A | * | 12/2000 | Kempka et al. | 60/302 |
| 6,192,676 B1 | * | 2/2001 | Zurbig et al. | 60/286 |

* cited by examiner

Primary Examiner—Thomas Denion
Assistant Examiner—Diem Tran
(74) Attorney, Agent, or Firm—McGlew and Tuttle, P.C.

(57) ABSTRACT

An exhaust cleaning system for motor vehicles, especially a diesel exhaust cleaning system for medium to heavy utility vehicles. The exhaust cleaning system has an exhaust muffler (1), a catalytic converter (2) and an exhaust particle filter element (3). The exhaust muffler (1), the catalytic converter (2) with a U-shaped tubular urea injection element (4) arranged upstream and an exhaust particle filter element (3) are integrated in a common housing and designed as a structural, functional unit.

19 Claims, 4 Drawing Sheets

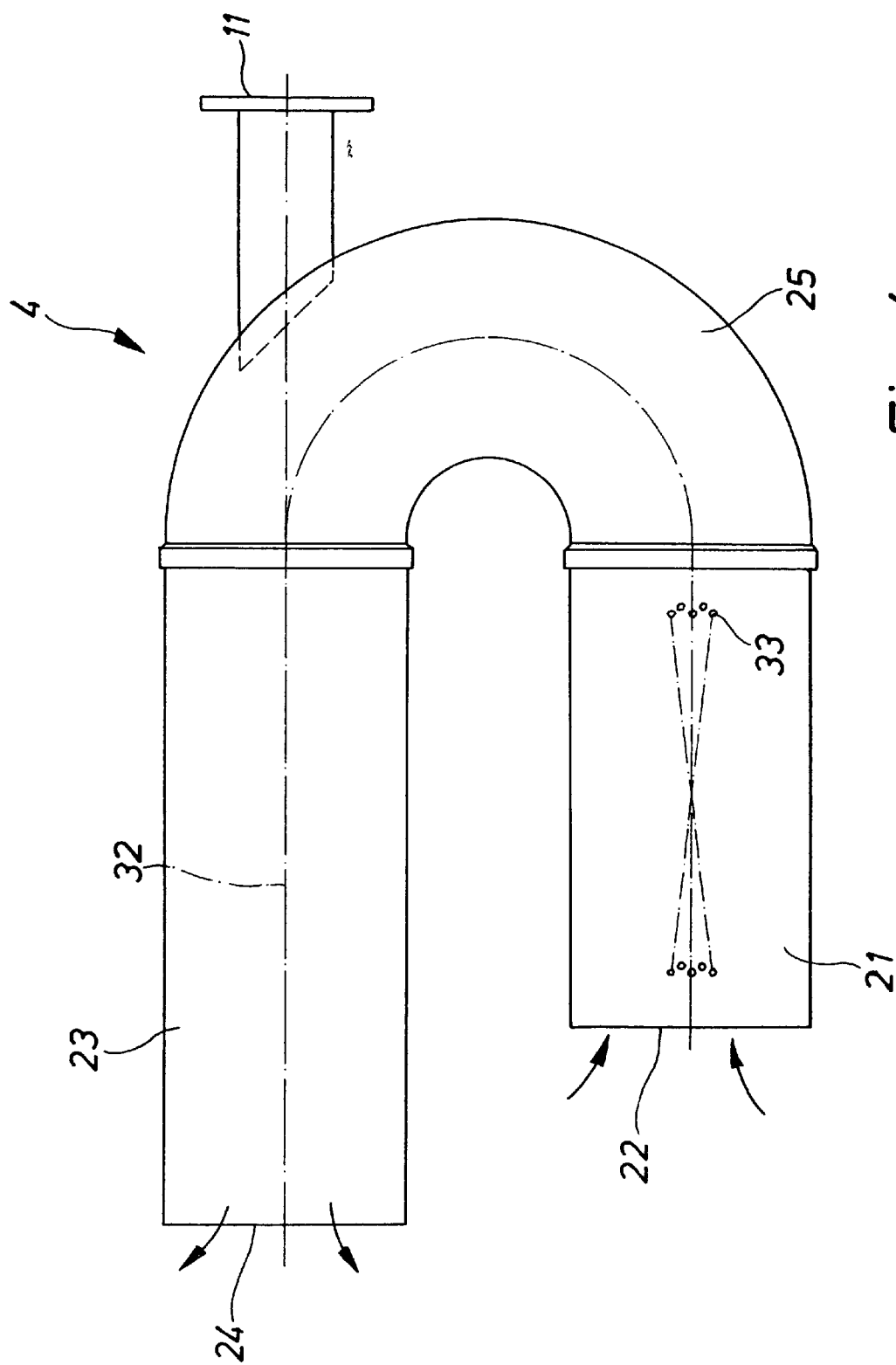

EXHAUST CLEANING SYSTEM FOR MOTOR VEHICLES, ESPECIALLY DIESEL-POWERED UTILITY VEHICLES

FIELD OF THE INVENTION

The present invention pertains to an exhaust cleaning system for motor vehicles, especially a diesel exhaust cleaning system for medium to heavy utility vehicles, with an exhaust muffler, catalytic converter and exhaust gas particle filter element.

BACKGROUND OF THE INVENTION

Diesel exhaust cleaning systems for utility vehicles of the above-mentioned type, in which the catalytic converter, the exhaust gas particle filter element, and one or more exhaust mufflers are arranged in the exhaust line of the utility vehicle behind the diesel engine, have been known according to the state of the art. The functions for muffling, HC/NOx reduction as well as soot particle reduction are assumed by individual, separate components of the exhaust system. The individual components require a relatively large space for mounting. In addition, depending on the weathering conditions, the individual components are subject to varying thermal stress and corrosion-promoting conditions, which compromise the service life. In addition, the mounting of the exhaust system is difficult.

SUMMARY AND OBJECTS OF THE INVENTION

Based on the above-mentioned general state of the art, the object of the present invention is to provide an exhaust cleaning system of the type mentioned in the introduction, which is characterized by an especially compact design and nevertheless efficiently and reliably assumes the functions of sound muffling, HC/NOx reduction and particle reduction with simple means.

According to the invention, an exhaust cleaning system is provided for motor vehicles, especially a diesel exhaust cleaning system for medium to heavy utility vehicles, with exhaust muffler, catalytic converter and exhaust gas particle filter element. The exhaust muffler, the exhaust gas particle filter element, and the catalytic converter are integrated in a common housing and form a structural, functional unit.

The exhaust muffler of a multichamber design with at least one baffle chamber and at least one absorption chamber in a common housing advantageously has an outerjacket with an oval to rectangular cross section and flat front-side axial ends, wherein the baffle chamber(s) and the absorption chamber(s) are separated from one another by at least one radial partition.

The catalytic converter is preferably an SCR catalytic converter for the selective catalytic reduction of the harmful substances present in the exhaust gas.

The exhaust gas particle filter element is preferably a diesel particle filter element.

In particular, the SCR catalytic converter, the diesel particle filter element, and a U-shaped tubular urea injection element are provided in the housing in the axial direction, extending over the chambers and essentially in parallel to one another.

In a special variant, the housing is divided by at least three radial partitions located at spaced locations from one another into at least four chambers, wherein the first partition between the first chamber and the second chamber, the second partition between the second chamber and the third chamber, as well as the third partition between the third chamber and the fourth chamber have passage openings for the fastened mounting of the SCR catalytic converter, the diesel particle filter element as well as the U-shaped tubular element.

The diesel particle filter element advantageously comprises a connection flange, to which a diesel burner is detachably fastened on the outside of the housing, wherein the connection flange is located and fastened in the plane of the first front-side axial end of the housing, which axial end is associated with the first chamber and limits the first chamber together with the first partition in the axial direction.

In the area of the other, second front-side axial end of the housing, the diesel particle filter element may have a conical cleaning bell with a blind plug that can be opened at the tapered end of the cleaning bell, the tapered end of the cleaning bell including the blind plug being located in the plane of the second front-side axial end of the housing.

Furthermore, the diesel particle filter element may have a first jacket perforation or opening in the area of the third chamber for the radially outwardly directed passage of the exhaust gas.

The diesel particle filter element preferably has a radial exhaust gas inlet in the area of the first chamber, an exhaust gas inlet pipe being provided on the housing jacket side.

With reference to the urea injection, the exhaust cleaning system comprises especially a U-shaped tubular element with a short straight tube section with an axial exhaust gas inlet in the area of the third chamber and a longer straight tube section with an axial exhaust gas outlet in the area of the fourth chamber, as well as a 180° elbow section in the area of the first chamber, wherein a straight urea feed pipe aligned with the axis of the longer tube section opens into the 180° elbow section approximately in the extension of the above-mentioned axis of the longer tube section, and the elbow section extends at least to the first axial end of the housing.

The short and long straight tube sections extend especially in parallel to one another at the same level of the housing.

The shorter straight tube section may have a jacket perforation in the area of the second chamber.

The SCR catalytic converter preferably comprises an axially directed, hollow exhaust gas outlet housing part in the area of the first chamber, while the catalytic converter core is located in the area of the fourth, third and second chambers.

In the area of the first chamber, the exhaust gas outlet housing part of the catalytic converter preferably has a jacket-side exhaust gas outlet opening, to which a tube elbow is connected, which leads to the first axial end of the housing and forms the exhaust gas outlet of the exhaust muffler.

The hollow exhaust gas outlet housing part may have a jacket perforation and a front-side perforation in the area of the first front-side axial end.

The housing of the catalytic converter core is preferably provided with stiffening beads.

The SCR catalytic converter comprises a box-shaped housing in a variant having a simple design.

In an especially advantageous variant of the present invention, the SCR catalytic converter and the diesel particle filter element as well as the U-shaped tubular element are embedded in an absorption material in the area of the first and second chambers and the first and second chambers are thus designed as absorption chambers, while the third and fourth chambers are baffle chambers.

A fifth chamber, which is arranged downstream of the fourth chamber, is designed as an absorption chamber and contains a muffler absorption material, is preferably provided at the second front-side axial end of the housing, and the fourth partition has perforations.

A compact system with the integrated functional modules muffling, NOx reduction and particle reduction is created by the present invention with minimal volume and at low manufacturing costs. The compact system is especially suitable for medium to heavy diesel-powered utility vehicles. The compact system also meets more stringent emission regulations.

In conjunction with the muffling of the exhaust noise, the reduction of the three functional components to a single functional component is performed in a combined system.

The compact system for the aftertreatment of the pollutant components HC/NOx/particles and muffling is characterized especially by muffing/NOx reduction/particle reduction by the integration of the three functional elements in a single housing with minimal volume, a diesel particle filter element with integrated diesel burner, especially for emergency regeneration under extremely cold operating conditions, e.g., during a short urban drive, an SCR catalytic converter arranged downstream of the diesel particle filter element with upstream urea injection plus mixing element, the possibility of cleaning the diesel particle filter element by blowing out the ash particles in the rearward direction via the burner connection after removal of the diesel burner and after opening the blind plug, embedding of the diesel particle filter element and of the SCR catalytic converter in the muffler absorption material, as a result of which there are no heat losses and a very fast LIGHT OFF system and optimal filter regeneration are achieved, optimal mixing of the urea by means of a special mixing element, e.g., an inserted flow coil, a semicircular flow loop and/or by means of a mixing nozzle.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 4 is a schematic top view of the U-shaped tubular urea injection element of the exhaust cleaning system similar to FIG. 3 with the diesel particle filter element not shown.

DESCRIPTION OF THE PREFERRED EMBODIMENT

Figure 1:
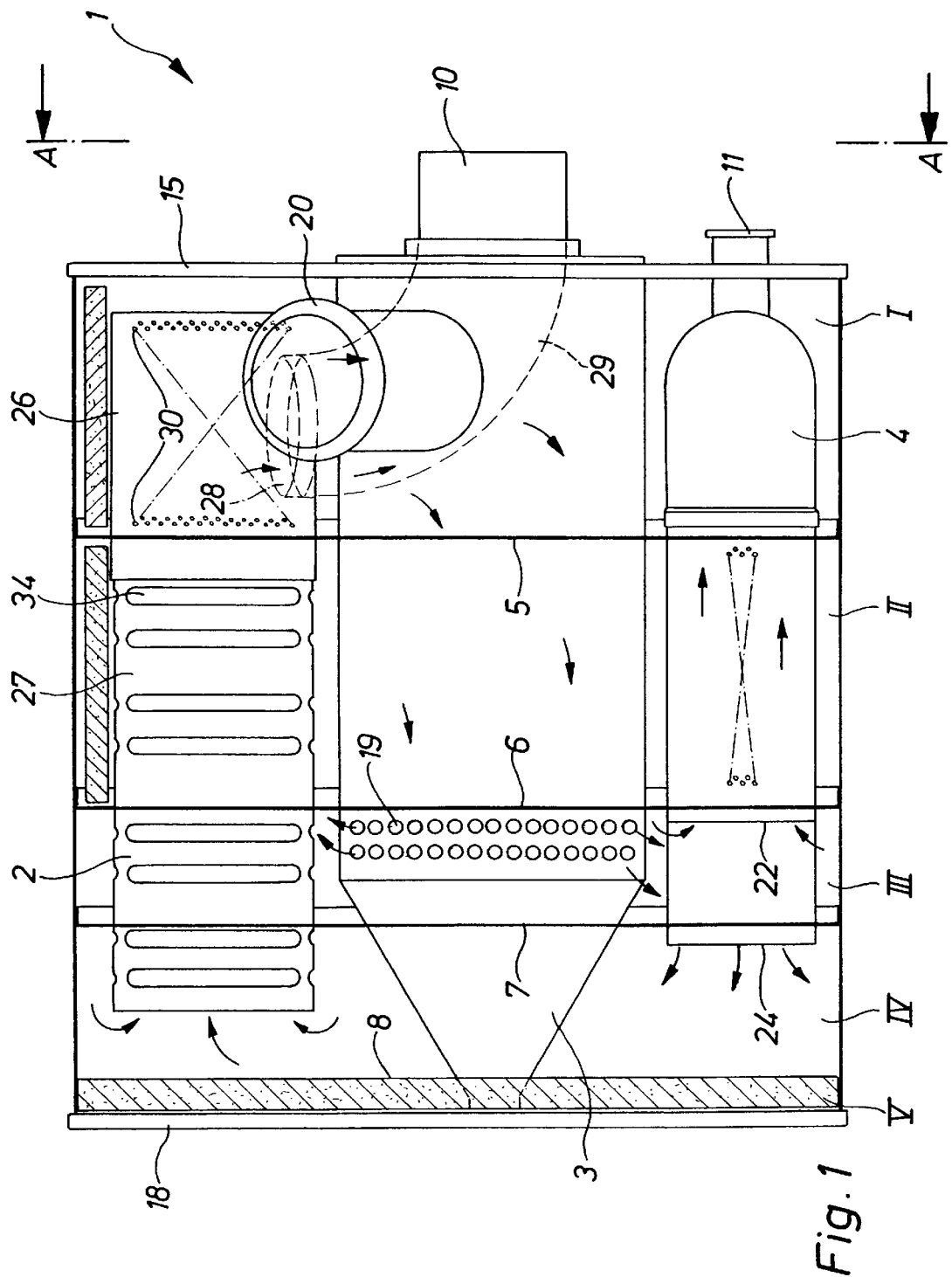
FIG. 1 is a schematic vertical axial sectional view of a combined exhaust cleaning system for a heavy diesel-powered utility vehicle in the form of an exhaust muffler of multichamber design with catalytic converter, diesel particle filter element and U-shaped tubular urea injection element.
Figure 2:
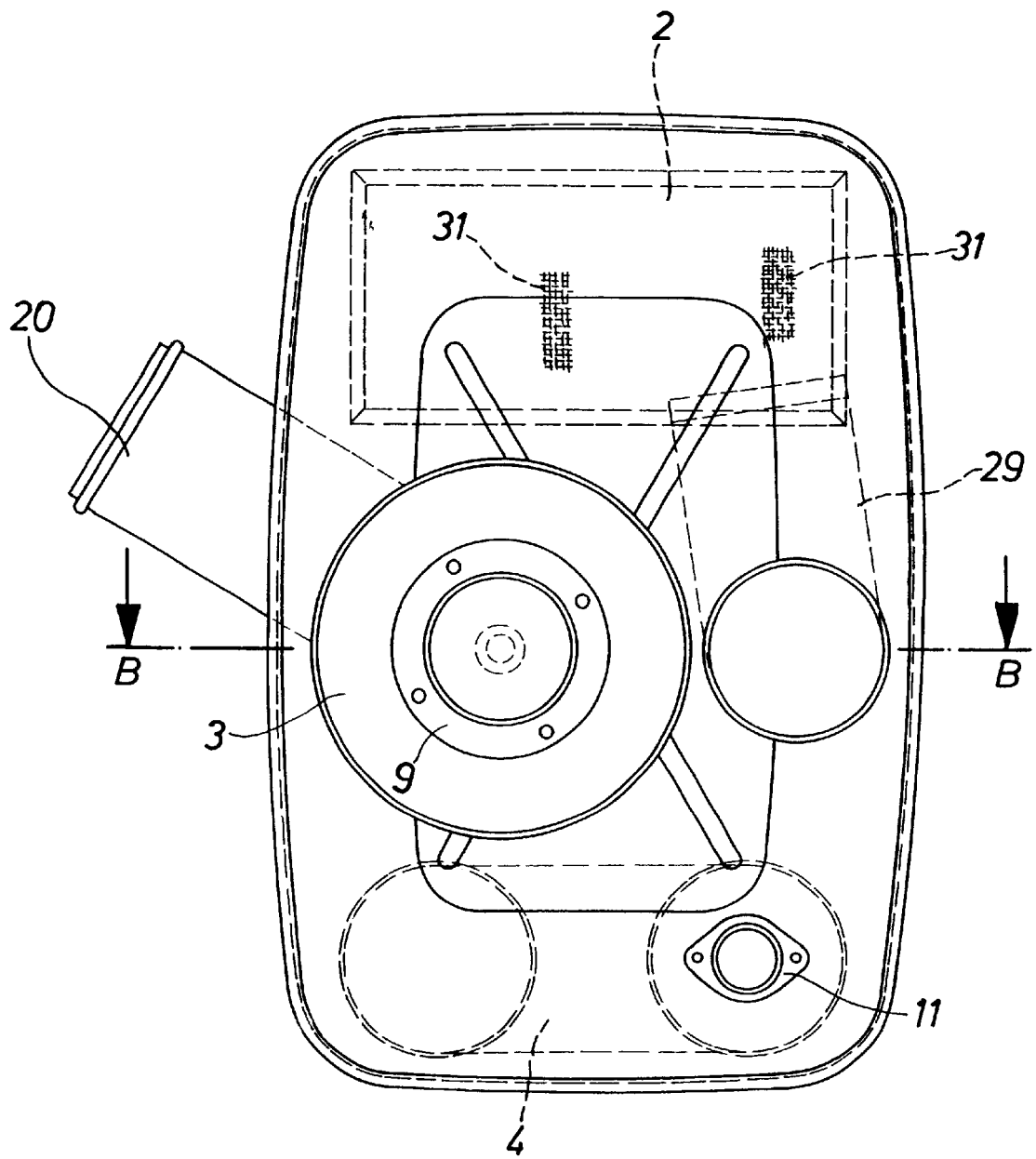
FIG. 2 is a schematic front view of the exhaust cleaning element according to FIG. 1 looking in the direction of line A—A in FIG. 1, with the diesel burner not shown.

Referring to the drawings in particular, an exhaust cleaning system in the form of a diesel exhaust gas cleaning system for heavy utility vehicles comprises three functional elements, namely, an exhaust muffler 1 for muffling the exhaust noise, an SCR catalytic converter 2 for the selective catalytic HC/NOx reduction with upstream urea injection through a U-shaped tubular urea injection element 4, as well as an exhaust gas particle filter element 3 for reducing the exhaust particles by filtering out soot particles and the like, and optionally afterburning or emergency regeneration by means of a connected diesel burner 10.

The exhaust muffler 1, the exhaust particle filter element 3, and the catalytic converter are integrated in a common housing and form a structural, functional unit.

The exhaust muffler 1 has a multichamber design with two baffle chambers and three absorption chambers in a common housing with an outerjacket of an oval to rectangular cross section and with flat front-side axial ends 15, 18. The two baffle chambers and the three absorption chambers are separated from one another by radial partitions.

The SCR catalytic converter 2, the diesel particle filter element 3 and the U-shaped tubular urea injection element 4 are provided in the housing extending in the axial direction, especially extending over the chambers and in parallel to one another.

The SCR catalytic converter 2 is located in the housing at the top, the diesel particle filter element 3 in the middle, and the U-shaped tubular element 4 at the bottom.

The housing is divided especially by four radial partitions 5, 6, 7, 8 located at spaced locations from one another into five chambers I, II, III, IV, and V. The first partition 5 is located between the first chamber I and the second chamber II. The second partition 6 is located between the second chamber II and the third chamber III. The third partition 7 is located between the third chamber III and the fourth chamber IV. The partitions 5, 6 and 7 have passage openings for the fastened mounting of the SCR catalytic converter 2, the diesel particle filter element 3 as well as the U-shaped tubular element 4.

The diesel particle filter element 3 comprises a connection flange 9, to which the diesel burner 10 is detachably fastened on the outside of the housing, where the fastening flange is located and fastened in the plane of the first front-side axial end 15 of the housing. The axial end 15 is associated with the first chamber I and limits the first chamber I together with the first partition 5 in the axial direction.

Figure 3:
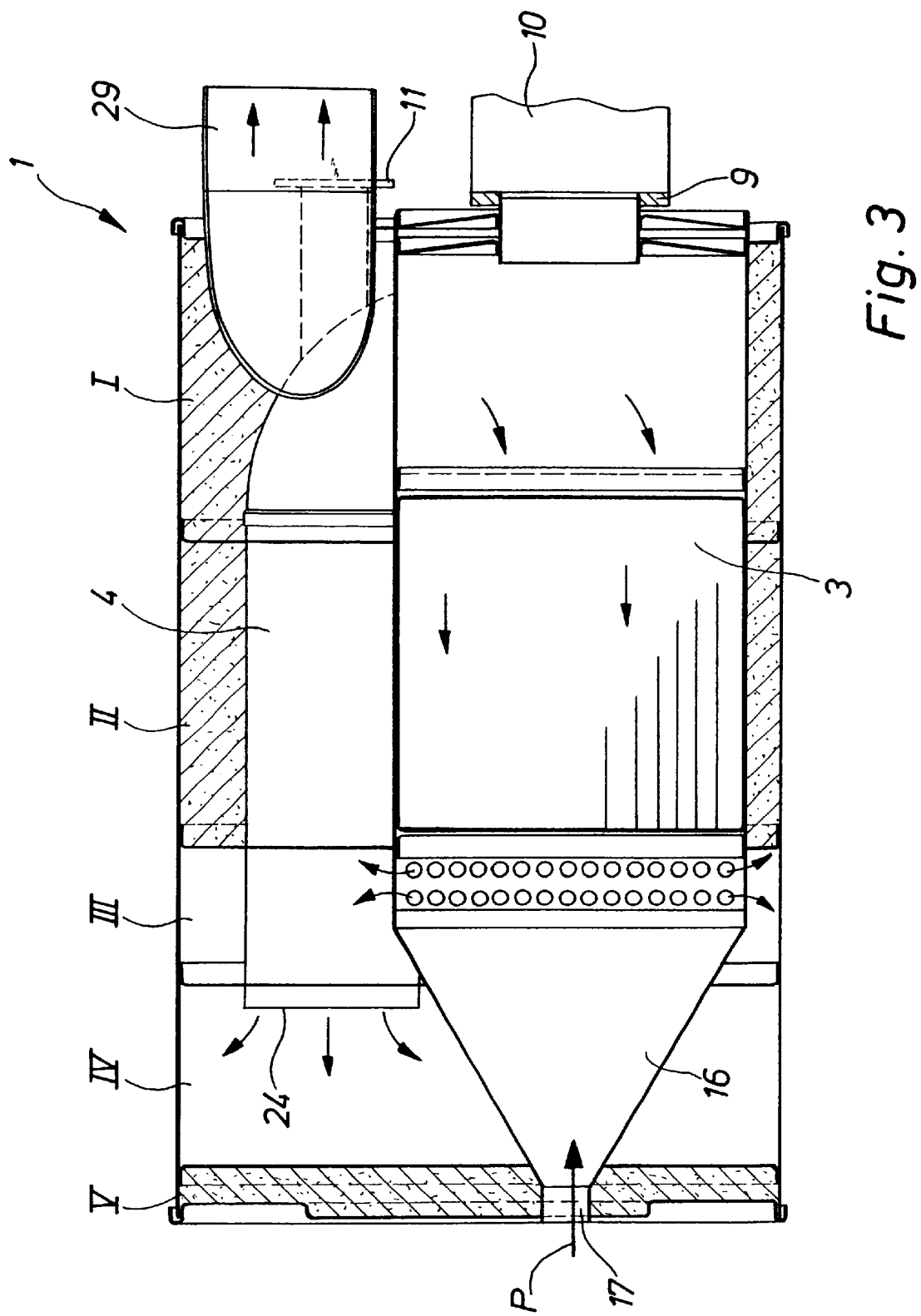
FIG. 3 is a schematic horizontal sectional view of the exhaust cleaning system according to FIGS. 1 and 2 taken along line B—B in FIG. 2.

In the area of the other, second front-side axial end 18 of the housing, the diesel particle filter element 3 has a conical cleaning bell 16 with a blind plug 17 that can be opened at the tapered end of the cleaning bell 16. The tapered end of the cleaning bell including the blind plug is located in the plane of the second front-side axial end 18 the housing. When the exhaust cleaning system is not in operation, the diesel particle filter element can be cleaned by blowing out the ash particles in the rearward direction in the direction of arrow P (see FIG. 3) after removal of the diesel burner and after opening the blind plug of the cleaning bell. The diesel particle filter element 3 also has a first jacket perforation 19 in the area of the third chamber III for the radially outwardly directed passage of the exhaust gas. The diesel particle filter element 3 also has a radial exhaust inlet in the area of the first chamber 1, an exhaust inlet pipe 20 being provided on the housing jacket side.

The U-shaped tubular element 4 has a short straight tube section 21 with an axial exhaust inlet 22 in the area of the third chamber III and a longer straight tube section 23 with an axial exhaust outlet 24 in the area of the fourth chamber IV, as well as a 180° elbow section 25 in the area of the first chamber I, wherein a straight urea feed pipe 11 aligned essentially with the axis 32 of the longer tube section 23 opens into the 180° elbow section 25 approximately in the extension of the axis 32, the elbow section 25 extending at least to the first axial end 15 of the housing and being provided with a mixing nozzle. As a result, chemically relatively corrosive urea can be injected centrally into the longer tube section 23 away from the tube wall, and the urea will then be converted into ammonia, which is needed for the exhaust gas treatment in the downstream SCR catalytic converter.

The short and long straight tube sections 21, 23 extend in parallel to one another at the same level of the housing.

The shorter straight tube section 21 has a jacket perforation 33 in the area of the second chamber II.

In the area of the first chamber I, the SCR catalytic converter 2 comprises on the outside an axially aligned hollow exhaust gas outlet housing part 26, while the catalytic converter core 27 is located in the area of the fourth, third and second chambers IV, III and II.

The exhaust gas outlet housing part 26 of the SCR catalytic converter 2 has, in the area of the first chamber I, a jacket-side exhaust gas outlet opening 28, to which a 90° elbow tube 29 is connected. The elbow tube 29 leads to the first axial end 15 of the housing and forms the exhaust gas outlet of the exhaust muffler 1.

The hollow exhaust gas outlet housing part 26 also has a jacket perforation 30 and a front-side perforation 31, which faces the first front-side axial end 15 of the housing.

The housing of the catalytic converter 2 has stiffening beads 34 in the area of the catalytic converter core 27 and has a box-shaped design.

The SCR catalytic converter 2 and the diesel particle filter element 3 as well as the U-shaped tubular element 4 are embedded in an absorption material in the area of the first and second chambers I and II and the first and second chambers I and II are thus designed as absorption chambers, while the third and fourth chambers III, IV are baffle chambers.

The above-mentioned fifth chamber V is an absorption chamber and is filled as such with a muffler absorption material. It is located especially at the second front-side axial end 18 of the housing and is arranged downstream of the fourth chamber IV and is limited axially by the fourth partition 8, which is provided with perforations.

While specific embodiments of the invention have been shown and described in detail to illustrate the application of the principles of the invention, it will be understood that the invention may be embodied otherwise without departing from such principles.

What is claimed is:

1. An exhaust cleaning system for motor vehicles, comprising:
    an exhaust muffler, a catalytic converter and an exhaust gas particle filter element integrated in a common housing and forming a structural and functional wilt;
    a U-shaped tubular urea injection element, wherein said exhaust muffler has multiple chambers and wherein said catalytic converter is a selective catalytic reduction (SCR) catalytic converter for the selective catalytic reduction of the harmful substances present in the exhaust gas, said SCR catalytic converter said particle filter element and said U-shaped tubular urea injection element extending in said housing in an axial direction essentially in parallel to one another and extending into multiple chambers.

2. An exhaust cleaning system in accordance with claim 1, wherein said exhaust muffler has at least one baffle chamber and at least one absorption chamber in said common housing, said common housing having an outer jacket of oval to rectangular cross section and flat front-side axial ends, said baffle chamber and said absorption chamber being separated from one another by at least one radial partition.

3. An exhaust cleaning system in accordance with claim 1, wherein said catalytic converter is a separate structure from said particle filter.

4. An exhaust cleaning system in accordance with claim 1, wherein said exhaust gas particle filter element is a diesel particle filter element.

5. An exhaust cleaning system in accordance with claim 1, further comprising said exhaust gas particle filter element being a diesel particle filter element;
    at least three radial partitions located at spaced locations from one another dividing said housing into at least four chambers and including a first partition located between a first chamber and a second chamber, a second partition located between said second chamber and a third chamber and a third partition located between a third chamber and a fourth chamber, said first partition, said second partition and said third partition each having passage openings for a fastened mounting of laid SCR catalytic converter, said particle filter element and said U-shaped tubular element.

6. An exhaust cleaning system in accordance with claim 5, wherein said diesel particle filter element has a connection flange, to which a diesel burner is detachably fastened on the outside of said housing, wherein said connection flange is located and fastened in the plane of a first front-side axial end of said housing, said first front-side axial end being associated with said first chamber and limiting said first chamber together with said first partition in the axial direction.

7. An exhaust cleaning system in accordance with claim 4, wherein said diesel particle filter element has a conical cleaning bell in an area of a second front-side axial cud of said housing, with said conical cleaning bell having a blind plug that can be opened at a tapered end of said cleaning bell, wherein said tapered end of said cleaning bell including said blind plug is located substantially in a plane of said second front-side axial end of said housing.

8. An exhaust cleaning system in accordance with claim 5, wherein said diesel particle filter element has a first jacket perforation in the area of said third chamber for the radially outwardly directed passage of the exhaust gas.

9. An exhaust cleaning system in accordance with claim 5 wherein said diesel particle filter element has a radial exhaust gas inlet in the area of said first chamber, wherein a housing jacket-side exhaust gas inlet pipe is provided.

10. An exhaust cleaning system in accordance with claim 5, wherein said U-shaped tubular element has a short straight tube section with an axial exhaust gas inlet in the area of said third chamber and a longer straight tube section with an axial exhaust gas outlet in the area of said fourth chamber as well as 180° elbow section in the area of said first chamber, wherein a straight urea feed pipe is aligned essentially with an axis of said longer tube section and opens into said 180° elbow section approximately in an extension of said axis and said feed pipe section extends at least to a first axial end of said housing.

11. An exhaust cleaning system in accordance with claim 10, wherein said short and long straight tube sections extend in parallel to one another at a same level of said housing shorter straight tube section has a jacket perforation in the area of said second chamber.

12. An exhaust cleaning system in accordance with claim 5, wherein in the area of said first chamber said SCR catalytic converter has an axially directed hollow exhaust gas outlet housing part on the outside and catalytic converter core is located in an area of said fourth chamber, said third chamber and said second chamber.

13. An exhaust cleaning system in accordance with claim 12, wherein in the area of said first chamber, said exhaust gas outlet housing put of said SCR catalytic converter has a jacket-side exhaust gas outlet opening to which a tube elbow is connected, said tube elbow leading to a first axial end of said housing and forming an exhaust gas outlet of said exhaust muffler, the hollow exhaust gas outlet housing part having a jacket side perforation and a front-side perforation, the housing of the catalytic converter core baying stiffening beads.

14. The exhaust cleaning system in accordance with claim 3, wherein said SCR catalytic converter has a box-shaped housing.

15. An exhaust cleaning system in accordance with claim 5, wherein said SCR catalytic converter and said diesel particle filter element and said U-shaped tubular element are embedded in an absorption material in an aria of said first and second chambers and said first and second chambers form absorption chambers and said third and fourth chambers form baffle chambers.

16. An exhaust cleaning system in accordance with claim 5, further comprising a fourth partition having perforations and a fifth chamber arranged downstream of said fourth chamber and provided as an absorption chamber and containing muffler absorption material, said fifth chamber being provided adjacent to the second front-side axial end of said housing.

17. An exhaust cleaning system comprising:

a housing having an inlet and outlet;

an exhaust muffler arranged in said housing;

a catalytic converter arranged in said housing;

an exhaust gas particle filter element arranged in said housing, said particle filter and said catalytic converter being formed as separate structures in said housing, said muffler, said catalytic converter and said particle filter being in communication with said inlet and said outlet of said housing;

said housing includes a jacket radially surrounding said muffler, said catalytic converter and said particle filter;

said catalytic converter and said particle lifter are arranged axially overlapping in said jacket of said housing.

18. A system in accordance with claim 17, wherein:

said housing includes passages serially connecting said catalytic converter and said particle filter with said inlet and skid outlet of said housing, said passages forming absorption and baffle chambers of said muffler.

19. An exhaust cleaning system comprising:

a housing having an inlet and outlet;

an exhaust muffler arranged in said housing;

a catalytic converter arranged in said housing an exhaust gas particle filter element arranged in said housing, said particle filter and said catalytic converter being formed as separate structures in said housing, said muffler, said converter and said particle filter being in communication with said inlet and said outlet housing;

said housing includes a jacket radially surrounding said muffler, said catalytic converter and said particle filter;

said catalytic converter an said particle filter are arranged radially aligned in said jacket of said housing.

* * * * *